July 18, 1933.    N. W. MATHEY    1,918,769
FINISH REMOVING MACHINE
Filed Aug. 17, 1929    2 Sheets-Sheet 1

Inventor
Nicholas W. Mathey
by Roberts Cushman Woodbury
Attys.

July 18, 1933.　　　　N. W. MATHEY　　　　1,918,769
FINISH REMOVING MACHINE
Filed Aug. 17, 1929　　　　2 Sheets-Sheet 2

Inventor
Nicholas W. Mathey
by Roberts Cushman Woodberry
Attys.

Patented July 18, 1933

1,918,769

UNITED STATES PATENT OFFICE

NICHOLAS W. MATHEY, OF BOSTON, MASSACHUSETTS

FINISH REMOVING MACHINE

Application filed August 17, 1929. Serial No. 386,594.

This invention relates to apparatus for removing the finish coating or layer from leather or equivalent sheet material as, for example, to facilitate the union of pieces of such material by means of cement, and provides for the rapid removal of a thin and uniform layer of the finish, regardless of irregularities in the thickness of the material, so that, although the finish is removed, the body of the material is not substantially weakened. While skiving machines commonly have been employed for thinning down the edge portions of shoe parts preparatory to uniting such parts in order to avoid unduly thick seams, such machines as usually constructed are designed to remove a layer of varying thickness as determined by irregularities in the surface of the material, so that the remaining or body portion of the material may be of substantially uniform thickness. While for such purposes these prior machines are desirable and satisfactory, they are wholly inadequate by reason of their inherent mode of operation, as just described, for use in removing the finish layer only. When adhesive is used for connecting parts of a shoe, it is found that the surface finish on the leather, particularly patent leather which has a glossy and impervious finish, prevents the adhesive from obtaining the secure grip necessary to unite the parts. For this reason it has been attempted to remove the surface finish as, for example, by scouring, brushing with a wire brush, or the like, but such mode of operation is slow, laborious and expensive, and previous skiving machines will not remove the finish without unduly cutting away the underlying material. In accordance with the present invention I have devised a machine which is capable of removing rapidly a very thin and substantially uniform layer from the finish or grain surface of the leather, regardless of irregularities in the thickness of the leather, and without substantially detracting from the strength of the material. In fact, the layer removed may be so thin as to comprise little more than the surface finish itself which, in the case of patent leather, usually comprises one or more coatings of oxidized oil or the like.

As one mode of obtaining this result I employ a feed roll which is normally disposed at a fixed and unvarying distance from the edge of a cylindrical skiving knife, such distance being so predetermined that it represents the desired thickness of the layer of surface finish to be removed, and in order to keep the work in proper relation to the knife edge I employ a yielding device, for example a presser-foot which, while urging the work toward the knife edge, is free to yield in accordance with every variation in thickness of the material.

In the accompanying drawings I have illustrated one desirable embodiment of the invention by way of example, and in the drawings, Fig. 1 is a side elevation of a skiving machine embodying the present invention;

Figure 1:
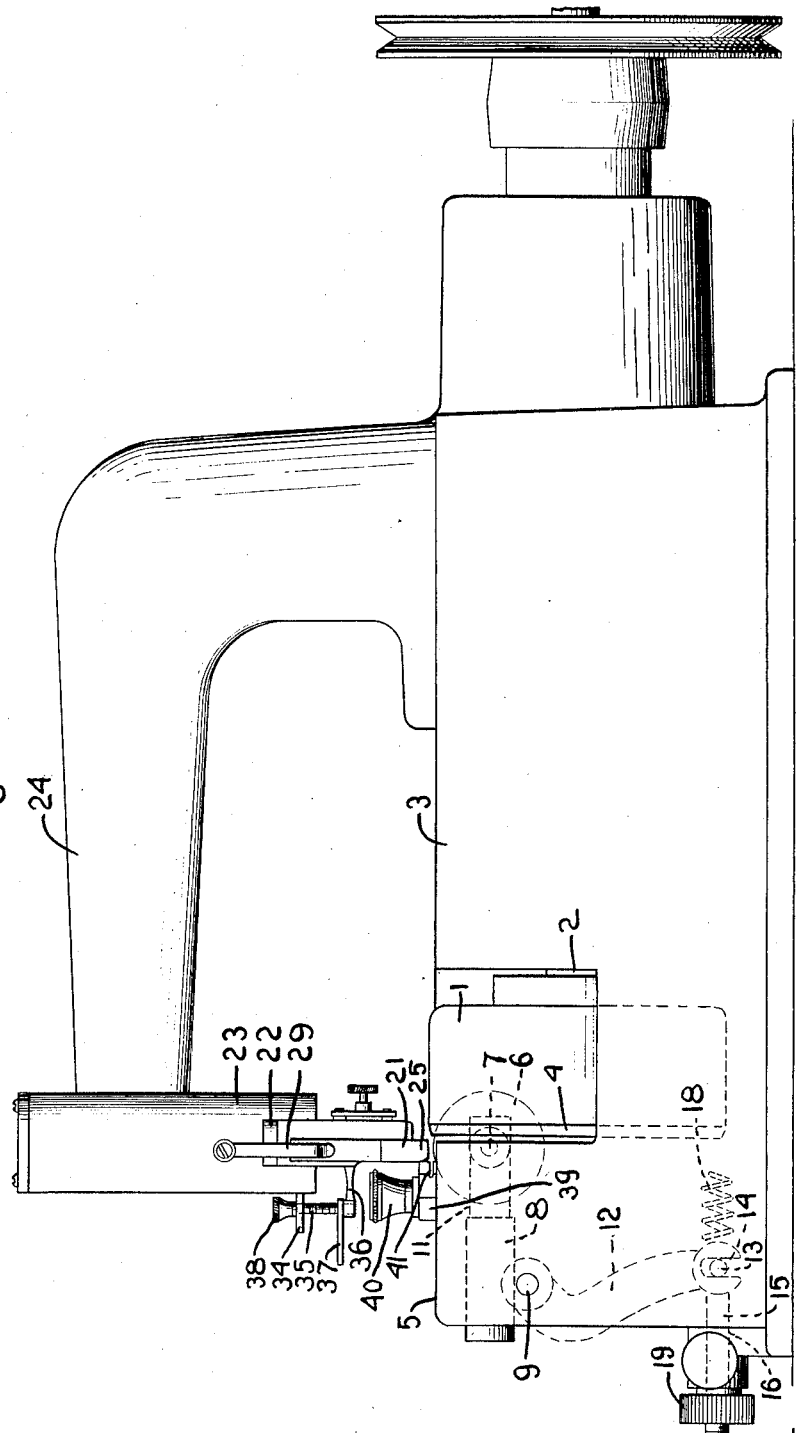
Figure 2:
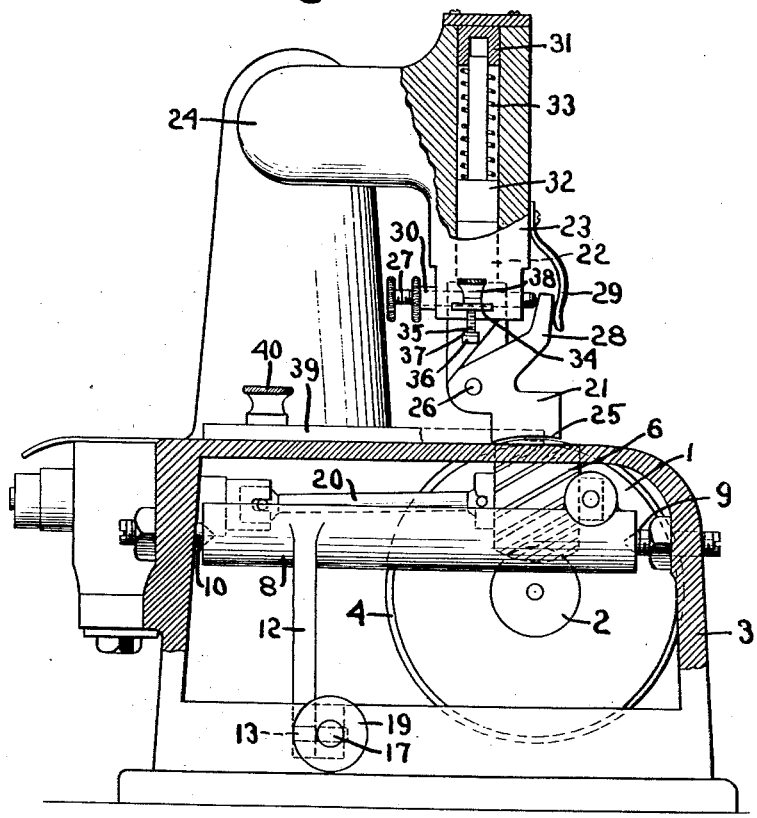
Fig. 2 is a front elevation, partly in vertical section, of the same apparatus.
Figure 3:
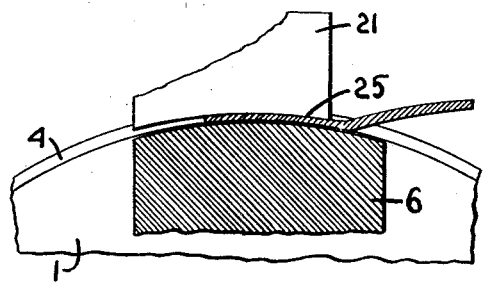
Fig. 3 is a fragmentary section, to larger scale, substantially in the vertical plane of the axis of the feed roll.
Figure 4:
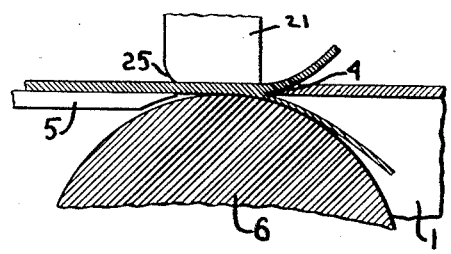
Fig. 4 is a fragmentary vertical section on a plane at right angles to the plane of Fig. 3.

In the embodiment herein chosen and illustrated the apparatus comprises a rotating cylindrical knife which cooperates with a feeding mechanism to cut a layer of predetermined thickness from the finished side of the leather. The feeding mechanism comprises a substantially unyielding feed roll which is driven at proper speed and disposed substantially concentrically with respect to the cutting edge of the knife. This feeding roll is adjustable in relation to the knife, within small limits, but is normally held unyieldingly in adjusted position. A presser-foot having a relatively light tension is located above the feed roll and cooperates with the latter to present the work to the knife. If the work varies in thickness, the presser-foot will rise and fall in accordance with the contour of the upper surface of the work, while maintaining the lower surface of the work in contact with the unyielding work engaging surface of the feed roll. While the improved device is of general utility, it is of special value in the preparation of the various parts which constitute the upper of a shoe, particularly when such parts are to be permanently united by the use of cement, and it is therefore desirable to remove a thin surface layer from the material in order to provide a better anchorage for the cement. The present invention is especially adapted for such treatment of leather, since by proper adjustment a very thin uniform layer ranging in thickness from three to six one-thousandths of an inch may be removed from the surface of the leather without substantially impairing the strength of the leather.

In the preferred embodiment of the invention herein shown, a cylindrical knife 1 is carried by a shaft 2 journaled in a frame 3 and driven from any suitable source of power. The knife 1 has a circular circumferential cutting edge 4, the upper portion of which projects up through an opening in the work support 5 over which the work is fed. The feed roll 6 is situated so that its upper feed or work engaging surface is closely adjacent to but within the circumference of the knife, the contour of the feed roll being substantially concentric with the cutting edge. The roll 6 is mounted for rotation upon a shaft 7 carried by an adjustable bracket 8. This bracket is pivoted in the frame at points 9 and 10, and has a supporting member 11 extending substantially horizontally therefrom, said supporting member carrying the shaft 7. An arm 12 depends from the bracket 8 and carries a pin 13 which is received in a vertical socket 14 in the end of a bar 15. This bar extends through and is guided in an aperture 16 in the frame and has its outer end screw threaded at 17. A heavy tension spring 18 is attached at one end to the arm 12 and at the other end to some convenient fixed part of the frame. This spring tends to rotate the frame 8 about its pivot, such movement being limited by a thumb nut 19 upon the threaded end 17 of the bar 15. This construction permits very fine adjustments of the feed roll with respect to the cutting edge of the knife, while at the same time the work engaging surface of the feed roll remains for all practical purposes always substantially concentric to the cutting edge. If there is any looseness or back-lash due to inaccuracy of feeding or wear between the parts, the spring 18 will take up such looseness so that adjustment of the thumb nut 19 provides for accurate adjustment of the feed roll in either direction, although the spring 18 is of such strength as to preclude substantially all possibility of downward movement of the feed roll under pressure of the work thereagainst. The feed roll 6 may be driven by a shaft 20 connected to any suitable rotating part (not shown).

Above the feed roll I provide a cooperating feeding member, here shown as a presser-foot 21, yieldingly supported by a post 22 guided for vertical sliding movement in a head 23 disposed above the feed roll and carried by the end of an overhanging arm 24 forming a portion of the frame of the machine. The presser-foot is provided with a lower guiding surface 25 and is pivoted at 26 upon the post 22. The guiding surface 25 is curved substantially concentrically with the knife 1, and may be disposed in proper relation to the cutting edge by means of the screw 27 which is threaded in the post 22 and bears at one end against the upstanding portion 28 of the presser-foot 21, said portion 28 being held against the end of the screw 27 by a leaf spring 29 attached to the head. When the presser-foot is properly adjusted, the screw 27 is locked in position by a nut 30.

The lower end of the head 23 is slotted to provide a guide for the lower part of the post 22 which preferably is rectangular in cross section. The upper part of the post 22 is preferably cylindrical and reduced in size to fit within a sleeve or bushing 31 in the top of the head 23 and which serves to guide the upper end of the post 22. Between the sleeve 31 and a shoulder 32 upon a post there is interposed a spring 33 which is relatively light as compared to the spring 18. By reason of this difference in the strength of the two springs, the presser-foot yields upwardly in response to the insertion of work between it and the feed roll, while the feed roll does not yield to any substantial extent.

In order to limit the downward movement of the presser-foot, when no work is in the machine, and to space the presser-foot properly from the knife to receive work of different thicknesses, I provide a fixed arm 34 projecting from the head 23 and provided with an aperture in which an adjusting screw 35 is free to move vertically. The other end of the screw 35 is threaded into a bracket 36 projecting from the post 23 and is provided with a lock nut 37. The upper end of the screw 35 has a knurled head 38 whose lower end bears against the arm 34, thus limiting the downward movement of the presser-foot. The screw 35 may be turned to adjust the presser-foot to the proper height above the knife and is then locked by the nut 37. The proper height of adjustment is determined by the minimum thickness of the material to be threaded and should be slightly less than such minimum thickness in order to insure constant pressure of the foot against the work. Since the skiving is usually confined to the marginal portion of the material, I provide an adjustable edge gauge or guide 39 for guiding the work transversely in a horizontal plane. This edge gauge or guide is adjustable to vary the width of the cut made by the knife and is held in adjusted position by the thumb screw 40. To assist in guiding the work, the guide 39 may be provided with a horizontal recess or rabbet 41 to embrace the edge of the work and to assist in its proper presentation in the knife edge.

I claim:

1. A machine for removing surface finish from a shoe-upper part, said machine comprising a rotary finish removing cutter, work feeding means engageable with the finished surface of the work and having its work engaging element disposed at a fixed and predetermined distance from the cutter, means for maintaining the work engaging element of the work feeding means substantially at this fixed and predetermined distance from the cutter during operation of the machine on material of variable thickness, and a yielding presser-foot engageable with the opposite side of the work and movable toward and from the feeding means in accordance with variations in thickness of the work.

2. In a machine for use in removing surface finish from shoe parts preparatory to uniting them by the use of cement, a finish removing instrumentality, a feed device, and a presser-foot cooperating with the feed device to present the work to the finish removing instrumentality, said feed device and finish removing instrumentality being normally spaced and maintained at a predetermined and substantially fixed distance apart to cause the finish removing instrumentality to remove a thin layer of predetermined and uniform thickness from the finished surface of the material regardless of irregularities in thickness of the material.

3. In a machine for use in removing surface finish from shoe parts preparatory to uniting them by the use of cement, a finish removing instrumentality, a feed device normally occupying a substantially fixed and predetermined relation to the finish removing instrumentality, means for maintaining the feed device in this substantially fixed and predetermined relation to the finish removing instrumentality during operation of the machine on material of variable thickness, and a yielding presser-foot for holding the work in operative engagement with the feed device, the feed device and presser-foot being so constructed and arranged as to cause the finish removing instrumentality to remove a thin layer of predetermined and uniform thickness from the finished surface of the material.

4. A machine for removing surface finish from a shoe-upper part, said machine comprising a finish removing instrumentality, a member engageable with the finished or outer surface of the shoe part for determining the thickness of the layer of finish to be removed, said member being disposed at a normally fixed and predetermined distance from the operative element of the finish removing instrumentality, means for maintaining said member substantially at this fixed and predetermined distance during operation of the machine on material of variable thickness, and means arranged to exert yielding pressure against the inner or unfinished side of the shoe part and to hold the latter in cooperative relation to the finish removing instrumentality.

5. In a skiving machine of the class described, a cylindrical knife, a feed roll having its work-engaging surface substantially concentric with the edge of the knife, a presser-foot, and spring means normally maintaining the feed roll and presser-foot in operative relation to the knife, the presser-foot being freely yieldable in response to varying thickness of the work, and the feed roll being substantially unyielding in response to changes in pressure due to varying thickness of the work thereagainst.

6. In a skiving machine of the class described, a cylindrical knife, a feed roll having its work-engaging surface substantially concentric with the edge of the knife, a presser-foot, a spring normally holding the feed roll in operative position, said spring being of such strength as to prevent substantially relative movement of the feed roll and knife in response to the pressure due to varying thickness of the work, and a relatively light spring urging the presser-foot toward the knife but permitting it to yield freely in response to variation in thickness of the work.

7. In a skiving machine of the class described, a cylindrical knife, a feed roll having its work-engaging surface substantially concentric with the edge of the knife, a presser-foot, a spring normally urging the presser-foot toward the cutting edge of the knife but permitting the presser-foot to yield in response to pressure of the work, and a relatively heavy spring normally holding the feed roll at a predetermined and unvarying distance from the knife edge against changes in pressure due to variations in thickness of the work.

8. In a skiving machine of the class described, a cylindrical knife, a feed roll having its work-engaging surface substantially concentric with the edge of the knife, a presser-foot, means for maintaining the feed roll in a definite and predetermined position and for adjusting the feed roll toward and from the knife edge, said adjusting means comprising a spring adapted to take up lost motion between the parts and of sufficient strength substantially to prevent movement of the roll toward and from the knife edge in response to variations in thickness of the work, and means yieldingly urging the presser-foot toward the knife edge but permitting movement of the presser-foot toward and from the knife edge in response to variations in thickness of the work.

9. In a skiving machine of the class described, a cylindrical knife, a feed roll having its work-engaging surface substantially concentric with the edge of the knife, the work-engaging surface of the roll being at a normally fixed distance from the edge of the knife, stop means for limiting the movement of the presser-foot toward the knife edge, and yielding means urging the presser-foot toward the knife.

10. In a machine for skiving a uniform thin layer from the grain surface of leather, a cylindrical knife, a feed roll having its work-engaging surface substantially concentric with and spaced at a normally unvarying distance from the edge of the knife, a presser-foot movable toward and from the knife edge, a spring urging the presser-foot toward the knife edge but permitting it to yield under pressure of the work, and an adjustable stop to limit movement of the presser-foot toward the knife edge.

11. In a machine for skiving a uniform thin layer from the grain surface of leather, a cylindrical knife, a feed roll having its work-engaging surface substantially concentric with and spaced at a normally unvarying distance from the edge of the knife, a reciprocable post, a presser-foot carried by the post, spring means reacting against the post whereby resiliently to urge the presser-foot toward the cutting edge of the knife, and adjustable stop means to limit movement of the post toward the knife.

12. A skiving machine of the class described comprising a work support, an overhanging arm having a head disposed above the work support, a cylindrical knife projecting upwardly through an opening in the work support, a feed roll having its work-engaging surface substantially concentric with the knife, means normally maintaining the work-engaging surface of the feed roll at a predetermined distance from the knife edge, a post vertically slidable in the head, a presser-foot carried by the post, means yieldingly urging the post and presser-foot toward the knife, an arm projecting from the post, a bracket projecting from the head, and adjustable means for limiting the movement of the arm relatively to the bracket.

13. In a skiving machine, the combination of a driven cylindrical knife, a feed roll having its engaging surface substantially concentric with the cutting edge of the knife, means for maintaining the feed roll normally at a fixed invariable distance from said edge during operation on work of variable thickness, and a presser-foot having an under surface substantially concentric with the cutting edge of the knife and operable to press the work against the said roll whereby to cause the work to be fed into engagement with the knife edge with one side of the work concentric with the cutting edge and spaced radially an invariable predetermined and substantially uniform distance therefrom.

14. In a skiving machine, the combination of a driven cylindrical knife, an adjustable feed roll having its work-engaging surface within and substantially concentric with the cutting edge of the knife, means for maintaining the feed roll normally at a fixed and unvarying distance radially inward from said edge during operation on work of variable thickness, a presser-foot having an under surface concentric with said cutting edge, and yielding means acting upon said presser-foot to press the work against the feed roll with an approximately uniform pressure responsive to variations in thickness of the work, whereby to feed the work against the knife edge with the under surface of the work concentric with the cutting edge and spaced radially therefrom a substantially unvarying predetermined distance.

15. In a skiving machine, the combination of a cylindrical skiving knife, a feed roll having its work-engaging surface substantially concentric with the cutting edge of the knife, means for maintaining the feed roll normally at a fixed and unvarying distance radially from said edge during operation on work of variable thickness, yielding means above the feed roll for urging the work into contact with the feed roll with an approximately uniform pressure responsive to variations in thickness of the work, whereby to cause the work to engage the cutting edge of the knife with the under surface of the work spaced radially from the edge of the knife a substantially unvarying predetermined distance, and means to guide the work transversely as it is fed to the knife.

16. In a skiving machine, the combination of a driven cylindrical knife, a substantially rigid feed roll having its work-engaging surface substantially concentric with the cutting edge of the knife and adjustable with relation thereto, said work-engaging surface of the feed roll being normally at a fixed unvarying distance radially from the knife edge, yielding means above the feed roll having an under surface substantially concentric with the cutting edge of the knife and operable to press the work into contact with the feed roll, said yielding means moving in response to variation in thickness of the work, but causing the work so to engage the knife that the under surface of the work is always at a predetermined and substantially unvarying distance radially from the knife edge, adjustable means to limit movement of said yielding means toward the knife, and means to guide the work transversely.

17. In an apparatus of the class described, the combination with a cutter, of a feed roll, means for supporting the feed roll for substantially rigid and unyielding engagement with material to be treated, a presser foot for yieldably holding material to be treated in engagement with the feed roll, means for urging the presser foot toward the feed roll, and means for limiting movement of the presser foot toward the feed roll.

18. The combination with a tubular cutter and a feed roll therefor, of means for supporting the feed roll for bodily movement toward and from the effective portion of the cutter and for maintaining the axis of the feed roll substantially parallel to its original position at all times.

19. The combination with a tubular cutter and a feed roll therefor, of means for supporting the feed roll for movement in an orbital path toward and from the effective portion of the cutter, and means for maintaining the axis of the feed roll substantially parallel to its original position during such movement regardless of variations in thickness of the work operated upon.

20. The combination with a tubular cutter and a feed roll therefor, of means for supporting the feed roll for bodily movement toward and from the effective portion of the cutter, means for maintaining the axis of the feed roll substantially parallel to its original position during such bodily movement, and means for holding the feed roll in different operative positions and for maintaining its axis substantially stationary while in such positions and feeding work of variable thickness.

21. In an apparatus of the class described comprising a tubular cutter, a feed roll therefor, and means providing for relative bodily movement of these parts to vary the distance between the surface of the feed roll and the cutting edge of the cutter, the combination of means for maintaining the axis of the feed roll substantially parallel to its original position during such relative movement and during operation of the machine upon work of varying thickness.

22. Apparatus of the class described comprising a tubular cutter, a feed roll for co-operating with the cutter, means for supporting these members for relative bodily movement, and means for maintaining the axis of the bodily movable member substantially parallel to its original position during this relative bodily movement and regardless of variations in thickness of the work operated upon.

NICHOLAS W. MATHEY.